(12) United States Patent
Inose et al.

(10) Patent No.: US 9,830,906 B2
(45) Date of Patent: Nov. 28, 2017

(54) SPEECH RECOGNITION CONTROL DEVICE

(71) Applicant: Kojima Industries Corporation, Toyota-shi, Aichi (JP)

(72) Inventors: Takashi Inose, Toyota (JP); Shinobu Nakamura, Toyota (JP)

(73) Assignee: Kojima Industries Corporation, Toyota-shi, Aichi (JP)

( * ) Notice: Subject to any disclaimer, the term of this patent is extended or adjusted under 35 U.S.C. 154(b) by 0 days.

(21) Appl. No.: 14/247,782

(22) Filed: Apr. 8, 2014

(65) Prior Publication Data
US 2014/0303969 A1    Oct. 9, 2014

(30) Foreign Application Priority Data
Apr. 9, 2013    (JP) ................. 2013-081185

(51) Int. Cl.
G10L 15/00    (2013.01)
G10L 15/22    (2006.01)
G10L 15/28    (2013.01)

(52) U.S. Cl.
CPC ............. G10L 15/22 (2013.01); G10L 15/28 (2013.01)

(58) Field of Classification Search
None
See application file for complete search history.

(56) References Cited

U.S. PATENT DOCUMENTS

| | | | | |
|---|---|---|---|---|
| 5,657,425 | A | * | 8/1997 | Johnson .................. G10L 15/24 704/275 |
| 2009/0055180 | A1 | * | 2/2009 | Coon .................. B60R 16/0373 704/251 |
| 2009/0326949 | A1 | * | 12/2009 | Douthitt et al. ............. 704/260 |
| 2011/0082690 | A1 | * | 4/2011 | Togami .................. H04R 1/406 704/201 |

FOREIGN PATENT DOCUMENTS

| | | |
|---|---|---|
| EP | 0653701 A1 | 5/1995 |
| JP | S61-227458 A | 10/1986 |

(Continued)

OTHER PUBLICATIONS

European Search Report for Application No. 14163534.2 dated Jul. 15, 2014.

(Continued)

Primary Examiner — Marivelisse Santiago Cordero
Assistant Examiner — Keara Harris
(74) Attorney, Agent, or Firm — Eric D. Babych; Brinks Gilson & Lione (57) ABSTRACT

A speech recognition control device has a plurality of microphones placed at different positions, a speech transmission control unit, and a speech recognition execution control unit. The speech transmission control unit stores data based on the speeches which are input from the microphones and time data related to ranks among the microphones, assigns ranks to the plurality of microphones using the time data based on a preset condition, and transmits a speech data signal corresponding to the microphone to the speech rec- (Continued)

ognition execution control unit in the order of the ranks. The speech recognition execution control unit executes the speech recognition process according to the order of the speech data signals transmitted from the speech transmission control unit.

4 Claims, 7 Drawing Sheets

(56) References Cited

FOREIGN PATENT DOCUMENTS

| JP | S 61-256397 A | 11/1986 |
| JP | 2000-194394 A | 7/2000 |
| JP | 2000194394 A * | 7/2000 |

OTHER PUBLICATIONS

Decision of Rejection with English translation for related Japanese Patent Application No. 2013-081185, dated Apr. 11, 2017 (4 pages).
Japanese Office Action from related JP App. No. 2013-081185, dated Dec. 6, 2016, with English translation. Five (5) pages.

* cited by examiner

SPEECH RECOGNITION CONTROL DEVICE

CROSS-REFERENCE TO RELATED APPLICATIONS

The entire disclosure of Japanese Patent Application No. 2013-81185, filed on Apr. 9, 2013, including the specification, claims, drawings, and abstract, is incorporated herein by reference in its entirety.

BACKGROUND

Technical Field

The present invention relates to a speech recognition control device that executes a speech recognition process to recognize that an input speech data signal is an execution command, and executes the execution command.

Related Art

In the related art, there are used speech recognition control devices which are equipped on a vehicle and for operating electronic devices such as an audio device and a navigation device by speech of a driver.

This type of speech recognition control device may comprise a switch for speech recognition provided at a peripheral part of a driver seat, a microphone provided on a ceiling part, and a head unit which is a control device. When the driver presses a speech recognition start switch, the speech recognition is started, and, when the driver says a command, the microphone acquires the speech and transmits a signal indicating the speech to the head unit. The head unit analyzes the speech signal with recognition software, and controls an electronic device according to the analysis.

A speech recognition control device described in JP 2000-194394 A includes microphones and speech recognition start switches provided in front of the driver seat and in front of the passenger seat, and, in two speech recognition start switches, the signal output is selectively permitted such that, when a signal of one switch is switched ON by an operation, the signal of the other switch is switched OFF. When the ON signal of the recognition start switch is generated, an air-conditioning device or an audio device is operated by recognizing the speech from the corresponding microphone.

In a structure where only one speech recognition start switch is provided at the peripheral part of the driver seat, it is difficult for users other than the driver to operate the electronic device with speech. On the other hand, in the structure where the signal output is selectively permitted from two speech recognition start switches as described in JP 2000-194394 A, when a plurality of users speak simultaneously, a plurality of execution commands cannot be executed by recognition of both speeches.

SUMMARY

An advantage of the present invention lies in the provision of a speech recognition control device that can execute a plurality of execution commands when a plurality of users speak simultaneously.

According to one aspect of the present invention, there is provided a speech recognition control device having a speech recognition execution control unit that executes a speech recognition process to recognize that an input speech data signal is an execution command and executes the execution command, the speech recognition control device comprising: a plurality of microphones placed at positions different from each other; and a speech transmission control unit that stores data based on speech which is input from each of the microphones and time data related to ranks among the microphones, that assigns ranks to the plurality of microphones using the time data based on a preset condition, and that transmits speech data signals corresponding to the microphones to the speech recognition execution control unit in an order of the rank, wherein the speech recognition execution control unit executes the speech recognition process according to an order of the speech data signals transmitted from the speech transmission control unit.

According to another aspect of the present invention, preferably, in the speech recognition control device, the condition is that, when speeches are simultaneously input from the plurality of microphones, the speech transmission control unit assigns the ranks to the plurality of microphones based on time data that indicate an order of completion of the speeches.

According to another aspect of the present invention, preferably, the speech recognition control device further comprises a plurality of operation units that are placed at periphery of the microphones, that obtain inputs of commands of start of speech recognition by an operation of a user, and that transmit a command signal indicating the input of the command to the speech transmission control unit, wherein the condition is that the speech transmission control unit assigns the ranks to the plurality of microphones based on time data that indicate an order of reception of the command signals from the plurality of operation units.

According to various aspects of the present invention, a plurality of microphones are assigned ranks based on a preset condition, speech data signals corresponding to the microphones are transmitted to the speech recognition execution control unit in the order of the rank, and the speech recognition execution control unit executes the speech recognition process in the order of the speech data signal transmitted from the speech transmission control unit. Because of this, it becomes possible to execute a plurality of execution commands when a plurality of users speak simultaneously.

BRIEF DESCRIPTION OF THE DRAWINGS

Preferred embodiment (s) of the present invention will be described in detail based on the following figures, wherein.

DESCRIPTION OF EXEMPLARY EMBODIMENTS

Figure 1:
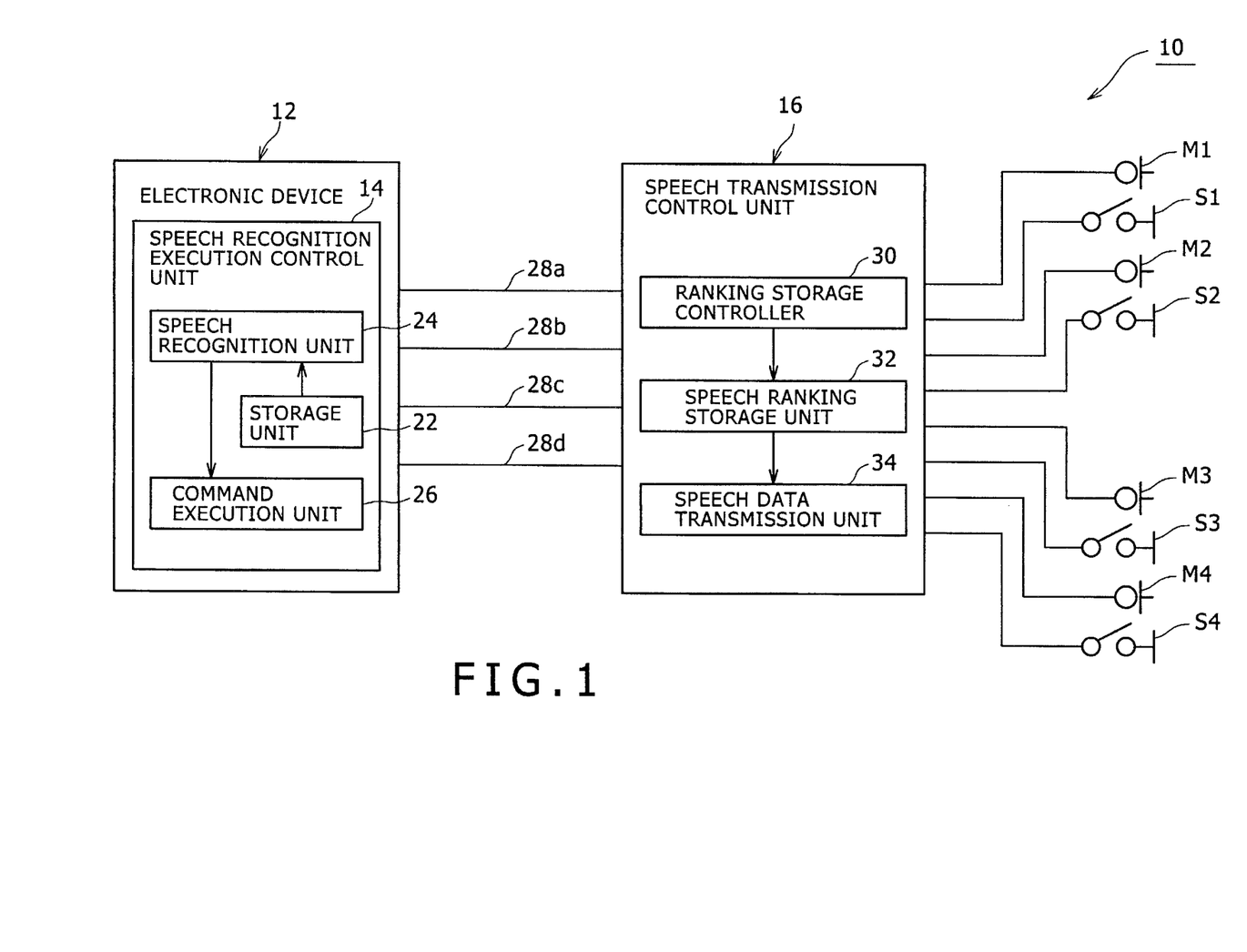
FIG. 1 is a block diagram showing a speech recognition control device according to a preferred embodiment of the present invention.

A preferred embodiment of the present invention will now be described with reference to the drawings. FIG. 1 is a block diagram showing a speech recognition control device 10 according to a preferred embodiment of the present invention. In the following, the described speech recognition control device 10 is to be equipped on a vehicle, but the speech recognition control device 10 is not limited to a structure for being equipped on a vehicle, and may alternatively be used to control with speech an electronic device placed inside of a room such as a structure for home usage or inside a factory.

In addition, in the following, a case is described in which an "electronic device 12" controlled by the speech recognition control device 10 is an audio device or a navigation device, or both audio and navigation devices, but the "electronic device" may alternatively be at least one of an air-conditioning device, a hands-free device (HF device) which is a vehicle-mounted telephone, and an electric component device controller that controls a wiper device and/or a headlight which are electric components that are not directly related to driving and controlling of the vehicle. In addition, a case is described in which the electronic device 12 includes a "speech recognition execution control unit 14," but alternatively, the "speech recognition execution control unit" may be provided as a separate member from the electronic device 12 and may control the electronic device 12 with speech. In this case, the speech recognition execution control unit may control a plurality of electronic devices 12 with speech. The speech recognition execution control unit is also referred to as a "head unit (H/U)."

The speech recognition control device 10 has an electronic device 12, a speech transmission control unit 16, a plurality of microphones M1, M2, M3, and M4, and speech recognition start switches S1, S2, S3, and S4 which are a plurality of operation units placed at a periphery of the microphones M1, M2, M3, and M4, respectively. The speech recognition control device 10 is equipped on a vehicle and used.

The electronic device 12 is an audio device, a navigation device, or a navigation device with an audio device. The electronic device 12 includes a speech recognition execution control unit 14. The speech recognition execution control unit 14 is formed from a microcomputer having a CPU and a memory, and has a storage unit 22, a speech recognition unit 24, and a command execution unit 26. The storage unit 22 stores a plurality of execution commands. The speech recognition unit 24 executes a speech recognition process to recognize that one of the plurality of execution commands stored in the storage unit 22 is speech data when a speech data signal is transmitted from the speech transmission control unit 16 to be described later. The speech recognition unit 24 may alternatively be formed from software which analyzes the input speech data. The command execution unit 26 executes an execution command when the speech recognition unit 24 recognizes that the execution command is speech data, and controls the electronic device 12. The execution command may alternatively be a command of a hierarchical structure stored in the storage unit 22. With the execution of the execution command, for example, volume adjustment or station selection of the audio device which is the electronic device is executed.

The speech transmission control unit 16 is connected to the electronic device 12 through a plurality of signal lines 28a, 28b, 28c, and 28d. The speech transmission control unit 16 is formed from a microcomputer having a CPU and a memory, and has a ranking storage controller 30, a speech ranking storage unit 32, and a speech data transmission unit 34. The speech transmission control unit 16 converts speech transmitted from the microphones M1, M2, M3, and M4 to be described later into digital speech data, and transmits the digital speech data to the speech recognition execution control unit 14 of the electronic device 12 as speech data signals. The ranking storage controller 30, the speech ranking storage unit 32, and the speech data transmission unit 34 will be described later in detail.

Figure 2:
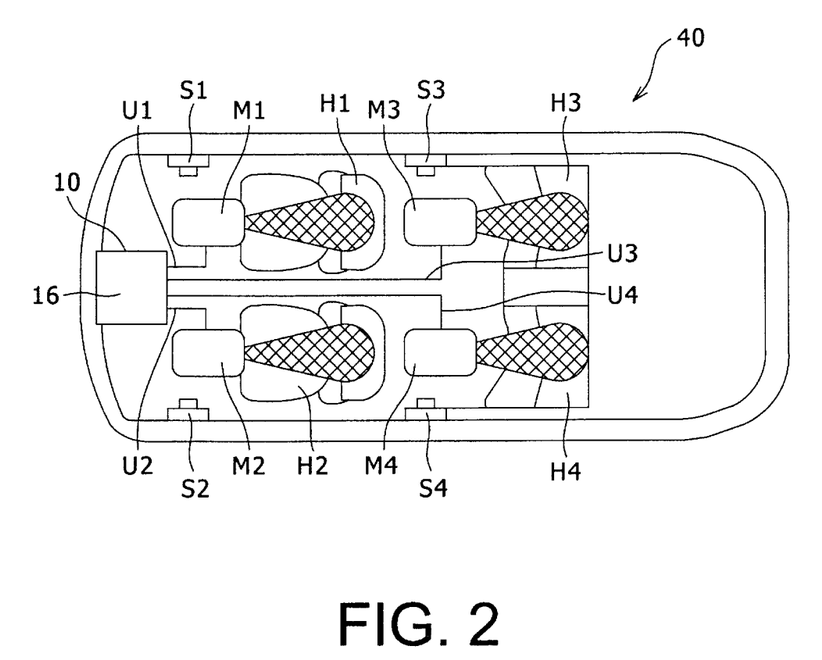
FIG. 2 is a perspective diagram of a microphone, an operation unit, and a speech transmission control unit of the speech recognition control device of FIG. 1 in a vehicle, as viewed from above.

The plurality of microphones M1, M2, M3, and M4 are nondirectional, and are placed at positions which are different from each other and which are at the periphery of a driver seat H1, a passenger seat H2, a rear right seat H3, and a rear left seat H4 (refer to FIG. 2). In the following, the microphones M1, M2, M3, and M4 placed at the periphery of the driver seat H1, the passenger seat H2, the rear right seat H3, and the rear left seat H4 may also be referred to as a "D-seat microphone M1," a "P-seat microphone M2," an "RR-seat microphone M3," and an "RL-seat microphone M4." The microphones M1, M2, M3, and M4 are connected to the speech transmission control unit 16, and the speeches input to the microphones M1, M2, M3, and M4 are transmitted to the speech transmission control unit 16.

FIG. 2 is a perspective diagram of the vehicle 40 as viewed from above, showing the plurality of microphones M1, M2, M3, and M4, the plurality of speech recognition start switches S1, S2, S3, and S4, and the speech transmission control unit 16 of the speech recognition control device 10. A left side of FIG. 2 corresponds to a front side of the vehicle, and a right side of FIG. 2 corresponds to a rear side of the vehicle. The plurality of microphones M1, M2, M3, and M4 are mounted at a ceiling part of the vehicle at the periphery of the corresponding seats H1, H2, H3, and H4, respectively. Alternatively, a directional microphone may be used. In FIG. 2, a slant-shaded portion shows a sound collectable range of high sensitivity when a directional microphone is used for each microphone.

The speech transmission control unit 16 is mounted around a central section of an instrument panel (not shown) on the front side of the vehicle, along with the electronic device 12 (FIG. 1). Wire harnesses U1, U2, U3, and U4 connecting the microphones M1, M2, M3, and M4 and the speech transmission control unit 16 may alternatively be passed inside a resin plate of a front-side pillar (not shown) on a side near the seat, in relation to the left-and-right direction of the vehicle.

Similar to the microphones M1, M2, M3, and M4, the plurality of speech recognition start switches S1, S2, S3, and S4 are also placed at the periphery of the driver seat H1, the passenger seat H2, the rear right seat H3, and the rear left seat H4. In the following, the speech recognition start switches S1, S2, S3, and S4 placed at the periphery of the driver seat H1, the passenger seat H2, the rear right seat H3, and the rear left seat H4 may also be referred to as a "D-seat SW S1," a "P-seat SW S2," an "RR-seat SW S3," and an "RL-seat SW S4," respectively.

The switches S1, S2, S3, and S4 are press-button type switches, and are connected to the speech transmission control unit 16. In FIG. 2, each of the switches S1, S2, S3, and S4 is mounted such that an operation button protrudes on an inner side surface of the door in the respective peripheral part next to the corresponding seat H1, H2, H3, or H4. When each of the switches S1, S2, S3, and S4 is operated; that is, pressed by the user who is to be the speaker, each of the switches S1, S2, S3, and S4 obtains an input of a command of start the speech recognition, and transmits a command signal indicating the command input to the speech transmission control unit 16. The numbers of the switches and the microphones may alternatively be set according to the seating capacity of the vehicle. The placement positions of the switches and the microphones are not limited to the above-described positions, and are only required to be positions near the expected user positions. The "operation unit" is not limited to the press-button type switches S1, S2, S3, and S4 as shown in the figures, and may alternatively be a pressing section of a predetermined area which is set on a display unit of a display device of the electronic device 12.

Figure 3:
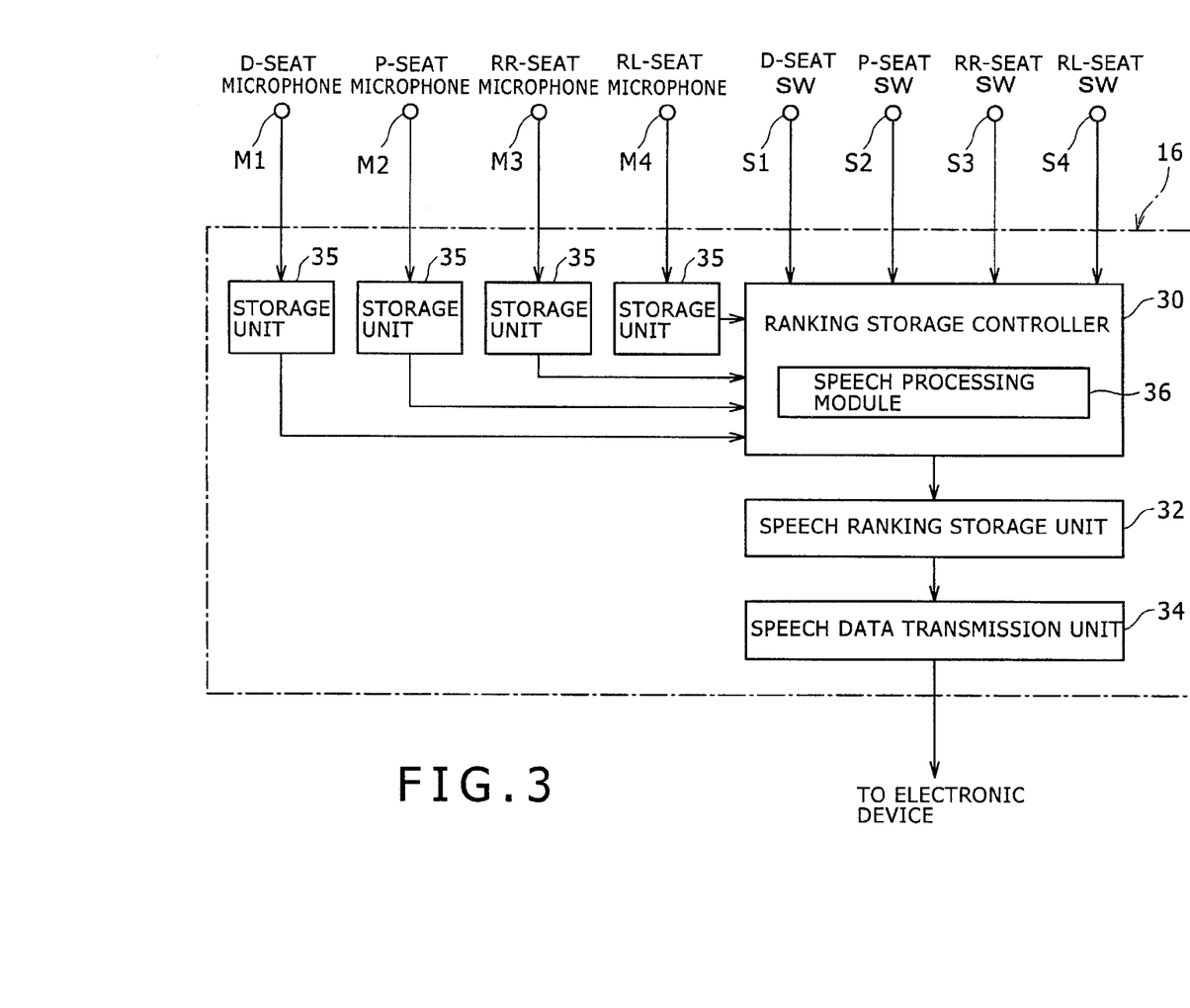
FIG. 3 is a structural diagram of a speech transmission control unit.

FIG. 3 is a structural diagram of the speech transmission control unit 16. The speech transmission control unit 16 includes a speech inputting unit (not shown), a plurality of storage units 35 corresponding to the microphones M1, M2, M3, and M4, the ranking storage controller 30, the speech ranking storage unit 32, and the speech data transmission unit 34. The speech inputting unit executes, when there is an input of speech from one or more of the microphones M1, M2, M3, and M4, an A/D conversion process on the speech signal, and outputs obtained speech data to the corresponding storage unit 35. The storage unit 35 stores the speech data which are input from the microphones M1, M2, M3, and M4 through the speech inputting unit, and also "time data" related to the ranking among the microphones M1, M2, M3, and M4. When the speech transmission control unit 16 obtains command input from one or more of the switches S1, S2, S3, and S4, the speech transmission control unit 16 instructs the storage units 35 corresponding to those switches S1, S2, S3, and S4 to start collecting the sound.

Alternatively, the storage unit 35 may temporarily store the speech and time data only when the speech transmission control unit 16 is activated. The "time data" are data indicating a time of completion of a speech of speech which is input to the microphones M1, M2, M3, and M4 and which is of a predetermined level or greater. The time data correspond to data indicating the time of completion of the speech of the command of the speaker and the order of completion of the speech when sounds of speeches are simultaneously input to two or more of the microphones M1, M2, M3, and M4. For example, as the time data, the time data T1, T2, T3, and T4 in the order from early completion of the speech are stored in correspondence with the microphones M1, M2, M3, and M4. Alternatively, the "time data" may be not stored in the storage unit 35, and, when the speech is processed by a speech processing module 36 to be described later, the speech completion time corresponding to the speech may be calculated as the "time data" and stored in the speech ranking storage unit 32 along with the speech data. The speech completion time may be determined by determining that the speech is completed when a silence is continued after the speech for a period greater than or equal to a predetermined period which is set in advance, and determining the starting time of the silence as the completion time of speech.

The ranking storage controller 30 has the speech processing module 36 which executes a speech process to be described later on the speech data which is read from the storage unit 35. The ranking storage controller 30 assigns ranks to the plurality of microphones M1, M2, M3, and M4 using the time data and based on a "predetermined condition" which is set in advance, and instructs the speech ranking storage unit 32 to store the speech data based on the speeches which are input from the microphones M1, M2, M3, and M4 in the order of the ranking. In this case, the "predetermined condition" is a condition that the speech transmission control unit 16 assigns the ranks to the microphones M1, M2, M3, and M4 based on the time data when there is a simultaneous input of speeches of a predetermined level or greater from a plurality of microphones M1, M2, M3, and M4, and that, when there is no simultaneous input of speeches of a predetermined level or greater by the plurality of the microphones M1, M2, M3, and M4, the microphone to which the speech is input is set as the microphone with the highest priority which is the highest rank. Because of this, when there is a simultaneous input of speeches of users simultaneously speaking to the plurality of microphones M1, M2, M3, and M4, the ranks are assigned in the order of completion of the speeches to the microphones M1, M2, M3, and M4, and the corresponding speech data are stored in the speech ranking storage unit 32 in the order from an earlier completion time of the speech.

The speech processing module 36 executes a speech process that reduces noise included in the speech which is input from one microphone (for example, M1) using the speech which is input from another microphone, and that converts the input speech to a clear speech. In this case, a microphone (for example, one of the microphones M2, M3, and M4) other than the microphone (for example, microphone M1) near the speaker who uses the speech recognition is used as a noise canceller. Alternatively, all microphones other than the microphone close to the speaker may be used as the noise canceller. For example, when it is determined that the number of speakers is one, all microphones (for example, all of microphones M2, M3, and M4) other than the microphone near the speaker may be used as the noise canceller.

Figure 4:
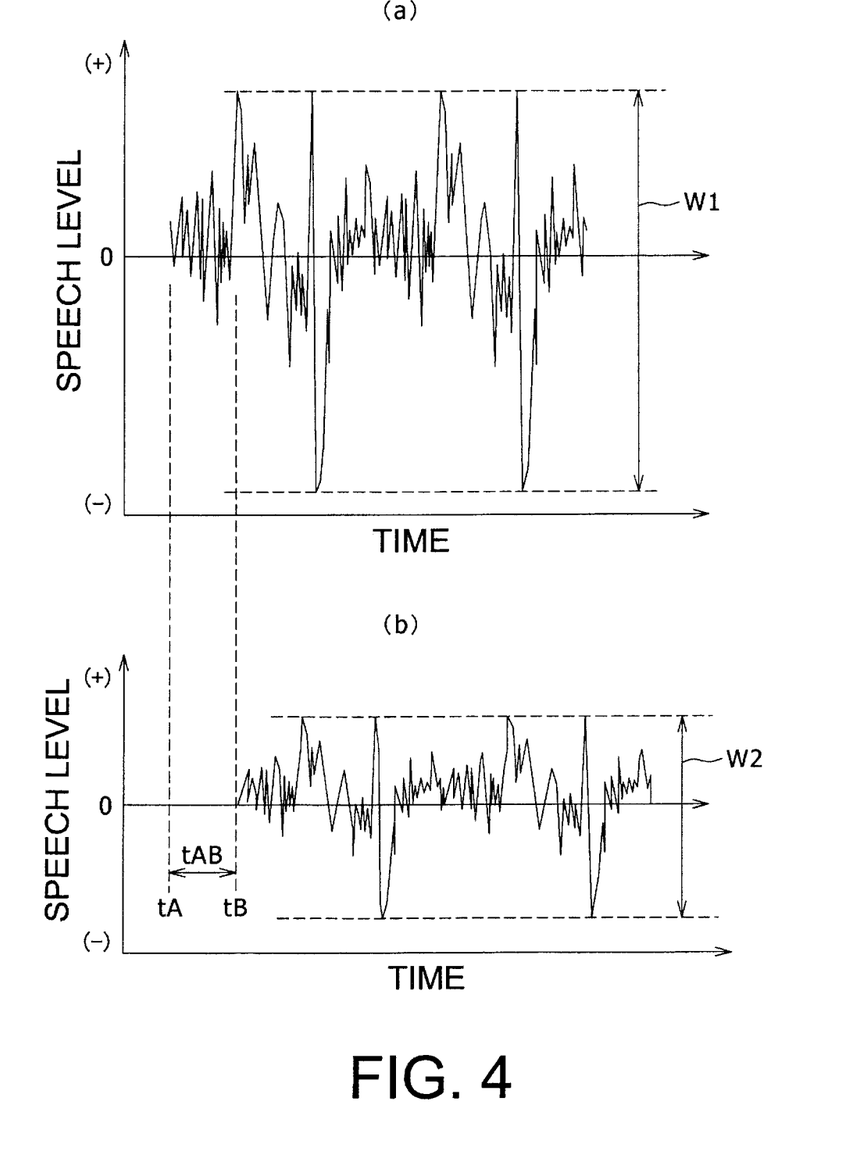
FIG. 4 is a diagram showing a difference in time-varying waveforms of a speech of the same speaker obtained by a microphone (a) close to the speaker and a microphone (b) far away from the speaker.

First, a principle of this speech process will be described with reference to FIG. 4. FIG. 4 is a diagram showing a difference in time-varying waveforms of the speech of the same speaker obtained by a microphone (a) near the speaker and a microphone (b) far away from the speaker. When the microphone near the speaker who uses the speech recognition is the D-seat microphone M1, the vehicle chamber is a closed space. Because of this, the speech of the driver is input not only to the D-seat microphone M1, but also to all of the P-seat microphone M2, the RR-seat microphone M3, and the RL-seat microphone M4. Therefore, when the sound is collected using the D-seat microphone M1 and one microphone other than the D-seat microphone M1, one microphone may be used as the noise canceller for the other microphone. In the following, this process will be described assuming that the microphone used as the noise canceller is the D-seat microphone M1.

FIG. 4(*a*) shows a time-varying waveform of the speech of the driver which is input to the D-seat microphone M1, and FIG. 4(*b*) shows a time-varying waveform of the speech of the driver which is input to the P-seat microphone M2. As can be understood from a comparison of FIGS. 4(*a*) and 4(*b*), a maximum amplitude W1 of the level of the speech of the driver which is input to the D-seat microphone M1 is greater than a maximum amplitude W2 of the level of the speech of the driver which is input to another microphone M2, and the sensitivity is higher. The amplitude of the speech waveform corresponds to the sound volume. In this manner, the sound volume is attenuated according to the distance between the speaker and the microphone.

A reaching time tA to the speech transmission control unit 16 (FIG. 1) for the speech of the driver which is input to the D-seat microphone M1 is earlier by time tAB than a reaching time tB to the speech transmission control unit 16 for the speech of the driver which is input to the other microphone M2. In this manner, delay in the sound is generated based on the distance between the speaker and the microphones.

When the speaker who uses the speech recognition is the user in the passenger seat and the driver speaks simultaneously, the speech of the driver can be removed as noise with respect to the speech which is input from the P-seat microphone M2 taking advantage of the above-described characteristic.

In the present embodiment, using such a principle, the speech processing module 36 reduces the noise included in the speech which is input from the microphone M2 of the speaker who uses the speech recognition, using the speech which is input from another microphone M1, to convert the speech to a clear speech. In this case, as can be understood from FIG. 4, for the speech of the speaker who uses the speech recognition, the amplitudes of the speech waveforms differ from each other between the speech which is input from the D-seat microphone M1 and the speech which is input from the P-seat microphone M2. Because of this, a ratio W2/W1 between the maximum amplitudes of the speech waveforms is calculated at a predetermined time which is set in advance, the level of the speech waveform of the driver having a high level which is input to the D-seat microphone M1 is reduced using the ratio W2/W1, and the speech waveform of the driver having the low level which is input from the P-seat microphone M2 is removed. In the above, a case is described in which the user in the passenger seat uses the speech recognition, but the speech waveform which becomes the noise can be removed in a similar manner when other passengers use the speech recognition.

The determination method of the speech waveform to be used for the noise cancellation is not limited to the determination based on the promptness of the reaching time of the speech to the speech transmission control unit 16 and the magnitude of the amplitude of the speech waveform in the speech waveforms which are input to the plurality of microphones as described above. For example, the speech waveform to be used for the noise cancellation may be determined from the speech waveforms which are input to the plurality of microphones based on only one of the promptness of the reaching time of the speech to the speech transmission control unit and the magnitude of the amplitude of the speech waveform. Alternatively, the noise cancelling function may be not used in the speech recognition control device of the present invention.

The speech data transmission unit 34 transmits the speech data stored in the speech ranking storage unit 32 in the order of the rank and in correspondence to the microphone to the electronic device 12 using the signal line 28*a* of FIG. 1, as a speech data signal. In addition, the speech transmission control unit 16 transmits, with the transmission of the speech data signal, a signal indicating the speaker data of the speaker expected to be near the microphone corresponding to the ranked speech data to the electronic device 12 using the signal line 28*b* of FIG. 1. For example, when the speech data corresponds to the microphone near the driver, the data to which the driver is correlated are transmitted in the order of the speech data. In addition, the speech transmission control unit 16 transmits, with the transmission of the speech data signal, a speech recognition SW signal indicating that the speech recognition is commanded to the electronic device 12 using the signal line 28*c* of FIG. 1. Moreover, when a hands-free device is connected to the electronic device 12, the speech transmission control unit 16 transmits to the electronic device 12, using the signal line 28*d* of FIG. 1, an HF state signal indicating that the hands-free device is being used. Alternatively, transmissions of the speaker data signal, the speech recognition SW signal, and the HF state signal may be omitted.

The speech recognition execution control unit 14 of the electronic device 12 executes the speech recognition process according to an order of the speech data signals transmitted from the speech data transmission unit 34.

According to the speech recognition control device 10 described above, even when the operation of the electronic device 12 is restricted by control during driving of the vehicle, the electronic device 12 can be operated using the speech recognition.

In addition, the plurality of microphones M1, M2, M3, and M4 are assigned with ranks based on the ranking of the microphones in the order of the completion of speech which is the preset condition, the speech data signals corresponding to the microphones M1, M2, M3, and M4 are transmitted to the speech recognition execution control unit 14 in the order of the ranks, and the speech recognition execution control unit 14 executes the speech recognition process in the order of the speech data signals transmitted from the speech transmission control unit 16. Because of this, a plurality of execution commands can be executed when a plurality of users have simultaneously spoken. In this case, for example, the speeches of the plurality of users are stored in the speech ranking storage unit 32 in the order of completion of speech, in the following manner.

Figure 5:
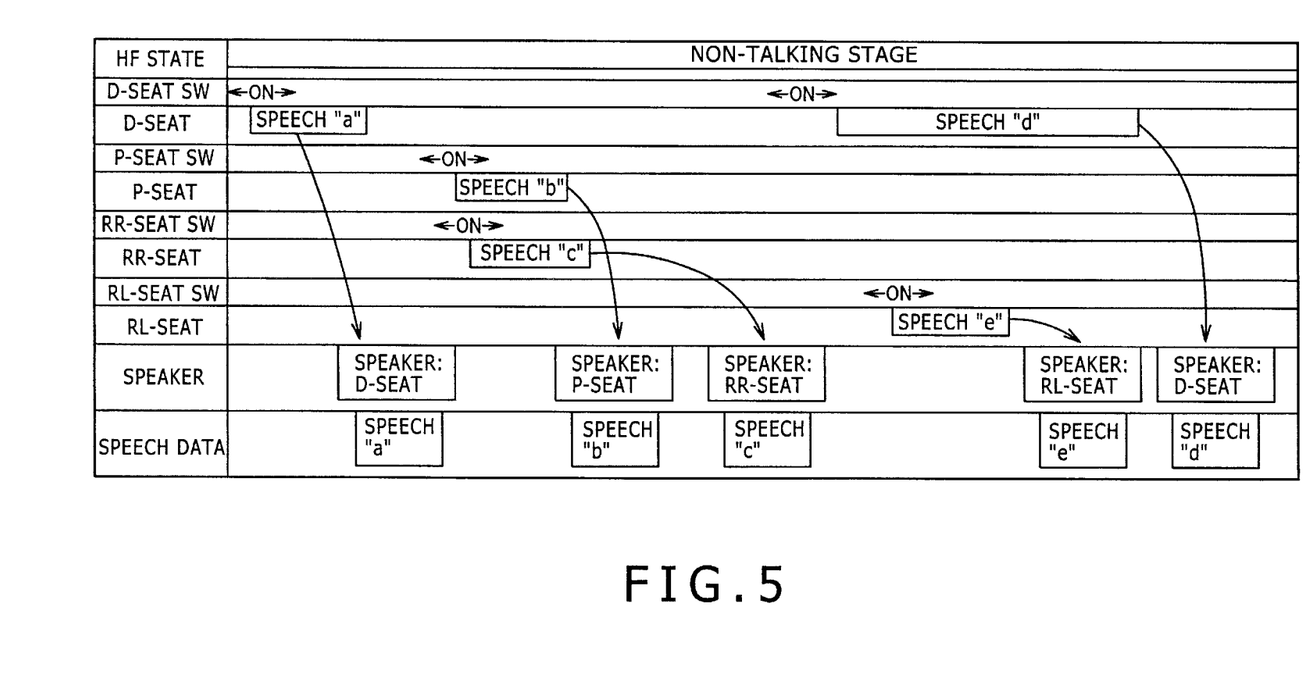
FIG. 5 is a time chart showing a situation of storage of speeches of a plurality of users in a ranking storage unit in a preferred embodiment of the present invention.

FIG. 5 shows in a time chart an example situation of storage of the speeches of the plurality of users in the ranking storage unit 32 in the present embodiment. In the following description, the driver seat H1, the passenger seat H2, the rear right seat H3, and the rear left seat H4 are described as the D-seat, the P-seat, the RR-seat, and the RL-seat, respectively, and the users positioned in the D-seat, the P-seat, the RR-seat, and the RL-seat are described as a D-seat user who is the driver, a P-seat user, an RR-seat user, and an RL-seat user, respectively. The description of "ON" on the column of each SW indicates that the switch is pressed.

First, of the plurality of switches S1, S2, S3, and S4, only the D-seat SW S1 is pressed by the D-seat user and the start of the speech recognition is commanded, and a speech "a" is input from the D-seat microphone M1. In this case, of all microphones M1, M2, M3, and M4, there is an input of a speech of a predetermined level or greater only in the D-seat microphone M1, and the speech data of speech "a" are stored in the speech ranking storage unit 32 after the speech of the D-seat user is completed.

Next, the P-seat SW S2 and the RR-seat SW S3 are pressed almost simultaneously, and the speech "b" of the P-seat user and the speech "c" of the RR-seat user are input from the microphones M2 and M3 as a plurality of speech inputs almost simultaneously. In this case, there are inputs of speeches of the predetermined level or greater in the microphones M2 and M3, but the speech of the P-seat user starts earlier and ends earlier than the speech of the RR-seat user. Because of this, the speech "b" of the P-seat user is stored in the speech ranking storage unit 32 earlier, and then, the speech "c" of the RR-seat user is stored in the speech ranking storage unit 32.

Next, after the D-seat SW S1 is pressed, the RL-seat SW S4 is pushed, a speech "d" of the D-seat user and a speech "e" of the RL-seat user are input to the microphones M1 and M4 as a plurality of speech inputs almost simultaneously, there are inputs of speeches of the predetermined level or greater at the microphones M1 and M4, and the speech "e" of the RL-seat user starts later and ends earlier than the speech "d" of the D-seat user. Because of this, the speech "e" of the RL-seat user is stored in the speech ranking storage unit 32 earlier, and then, the speech "d" of the D-seat user is stored in the speech ranking storage unit 32. In FIG. 5, in the entirety of the speaking periods of the users, the hands-free device is in the non-talking state which is a non-used state. The speech data signal indicating the speech data stored in the speech ranking storage unit 32 is transmitted to the speech recognition execution control unit 14 along with the signal indicating the ranked speaker data.

Figure 6:
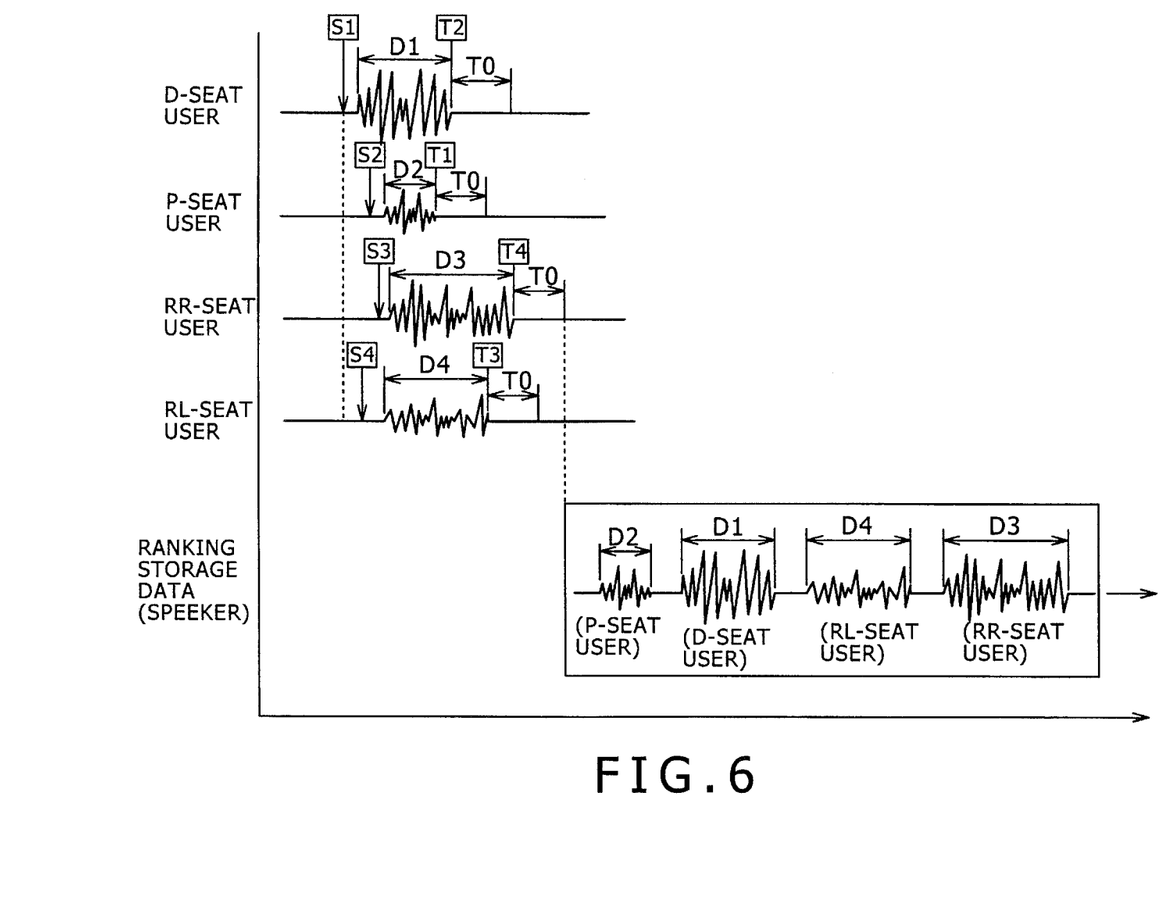
FIG. 6 is a time chart schematically showing the situation of storage of speech data in a ranking storage unit when a plurality of users simultaneously speak in a preferred embodiment of the present invention.

FIG. 6 schematically shows in a time chart an example situation where the speech data are stored in the speech ranking storage unit 32 in a case where four users speak simultaneously. In FIG. 6, in order to facilitate understanding of the speech data of the users and the ranked storage data stored in the speech ranking storage unit 32, the data are shown as speech waveforms. In addition, the pressed times of the switches S1, S2, S3, and S4 are shown with arrows of S1, S2, S3, and S4. In addition, arrow ranges of D1, D2, D3, and D4 show the speech times of the users. T1, T2, T3, and T4 show an order of completion of the speech among the speeches of the users, from an early completion. T0 is a silence determination time which is set at a predetermined time in advance, for determining the completion of the speech.

In the example of FIG. 6, the switches S1, S2, S3, and S4 are pressed almost simultaneously, and the users in the seats speak almost simultaneously. The order of completion of the speech is the P-seat user, the D-seat user, the RL-seat user, and the RR-seat user. Because of this, the speech data are stored in the speech ranking storage unit 32 in the order of the P-seat user, the D-seat user, the RL-seat user, and the RR-seat user, and the speech data signals indicating the speech data are transmitted to the speech recognition execution control unit 14 along with the signals indicating the ranked speaker data.

In this manner, the speech data are stored in the speech ranking storage unit 32 in the order of completion of the speech, and the speech recognition execution control unit 14 executes the speech recognition according to the ranks. Such a configuration is effective when the execution command is to be quickly executed in a case where the lengths of time of the speeches of the users are not limited in the speech recognition.

Figure 7:
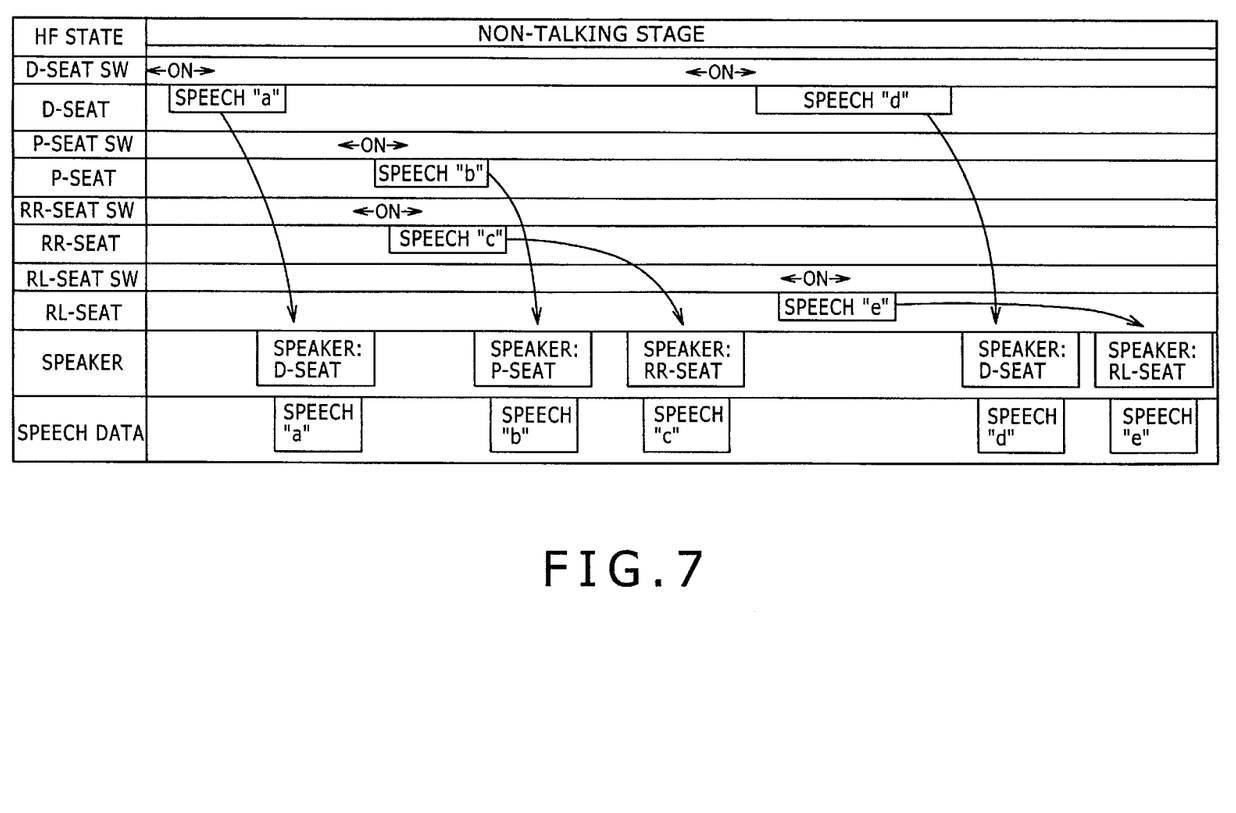
FIG. 7 is a diagram showing a time chart corresponding to FIG. 5 in an alternative configuration of a speech recognition control device according to a preferred embodiment of the present invention.

FIG. 7 is a diagram showing a time chart corresponding to FIG. 5 in an alternative configuration of the speech recognition control device of the preferred embodiment of the present invention. In the above description, a case is described in which, when there are inputs of speeches of the users who have spoken simultaneously in the plurality of microphones M1, M2, M3, and M4, the microphones M1, M2, M3, and M4 are assigned with ranks in the order of completion of the speech. On the contrary, in the present configuration, the microphones M1, M2, M3, and M4 are assigned with the ranks in the order of pressing of the switches S1, S2, S3, and S4 in the case where there are inputs of speeches of the speakers who have spoken simultaneously in the plurality of microphones M1, M2, M3, and M4.

In the structure of the present configuration, the ranking storage controller 30 assigns ranks to the plurality of microphones M1, M2, M3, and M4 using the "time data" based on a predetermined condition which is set in advance, similar to the above-described configuration, and instructs the speech ranking storage unit 32 to store as the speech data the speeches corresponding to the microphones M1, M2, M3, and M4 in the order of the ranks. On the other hand, the "time data" are data indicating the order in which the speech transmission control unit 16 receives the command signals from the plurality of switches. Because of this, when there are inputs of speeches of the speakers who have spoken simultaneously in the plurality of microphones M1, M2, M3, and M4, the microphones M1, M2, M3, and M4 are assigned the ranks in the order of pressing of the switches, and the corresponding speech data are stored in the speech ranking storage unit 32 in the order from earlier operation of the switch.

In the example of FIG. 7, the speech "d" of the D-seat user and the speech "e" of the RL-seat user are almost at the same time, but the RL-seat SW S4 is pressed after the D-seat SW S1 is pressed. Because of this, the speech "d" of the D-seat user is stored in the speech ranking storage unit 32 earlier and then, the speech "e" of the RL-seat user is stored in the speech ranking storage unit 32.

According to the structure of the present configuration, the speech data are stored in the speech ranking storage unit 32 in the order of pressing of the switches, and the speech recognition is executed by the speech recognition execution control unit 14 in that order. In this case, because a higher priority is given to the user who has executed the operation of the switch first among the users, and the speech recognition is executed, the configuration is effective when reducing discomfort of the user is of a higher priority. Other structures and operations are similar to those of the structure shown in FIGS. 1-6.

In the above description, a case is described in which a plurality of storage units 35 corresponding to the microphones M1, M2, M3, and M4 are provided corresponding to the number of the microphones, but alternatively, a common storage unit may be employed as a storage unit in which the speeches from the microphones M1, M2, M3, and M4 are stored, and the speeches may be stored in a plurality of storage regions of the storage unit corresponding to the microphones M1, M2, M3, and M4. In addition, in this case, a storage unit to which the data are input from the microphones M1, M2, M3, and M4 and the speech ranking storage unit may be set as a plurality of storage regions which are separately set in the common storage unit.

Moreover, in the above-described structures, a hands-free device may be used as the electronic device 12 to apply the present invention to a simultaneous conversation participation system using the hands-free device. In this case, the ranks of the speech recognition may be assigned under a condition different from those of the above. In addition, depending on the characteristic of the microphone, the above-described structures may be employed for collecting data of a frequency band other than an audible band, such as an ultrasound range.

What is claimed is:

1. An on-vehicle speech recognition control device having a speech recognition execution control unit adapted to execute a speech recognition process to recognize that an input speech data signal is an execution command and adapted to execute the execution command, the speech recognition control device comprising:
 a plurality of microphones placed at different positions located at peripheral portions of a plurality of seats, respectively, within a vehicle; and
 a speech transmission control unit adapted to store data based on a speech which is input from each of the microphones and data related to ranks among the microphones and indicating an order of completion of the speeches, the speech transmission control unit being further adapted to assign ranks to the plurality of microphones based on the data indicating the order of completion of the speeches in the order from an earlier completion time of the speech, when speeches are simultaneously input from the plurality of microphones, the speech transmission control unit being further adapted to transmit speech data signals corresponding to the microphones to the speech recognition execution control unit in an order of the ranks, wherein the speech recognition execution control unit is adapted to execute the speech recognition process according to an order of the speech data signals transmitted from the speech transmission control unit.

2. The on-vehicle speech recognition control device according to claim 1, wherein the speech transmission control unit uses at least a first microphone of the plurality of microphones as a noise canceller to remove a waveform corresponding to a first time waveform of a speech obtained through the first microphone from a second time waveform of a speech obtained through a second microphone of the plurality of microphones.

3. The on-vehicle speech recognition control device according to claim 2, wherein the speech transmission control unit calculates a ratio W2/W1, wherein W2 is a maximum amplitude of the second time waveform and W1 is a maximum amplitude of the first time waveform at a predetermined time, and removes, from the second time waveform, a waveform obtained by reducing a level of the first time waveform using the calculated ratio as the waveform corresponding to the first time waveform.

4. The on-vehicle speech recognition control device according to claim 2, wherein the speech transmission control unit determines a speech time waveform that is to be used as a noise canceller from among time waveforms of speeches obtained through the plurality of microphones, based on at least the promptness of the reaching time of the speech to the speech transmission control unit.

* * * * *